United States Patent [19]

Goates

[11] Patent Number: 5,016,488
[45] Date of Patent: May 21, 1991

[54] SHIFT MECHANISM FOR ENGAGING SLIDING GEAR IN MANUAL TRANSMISSION

[75] Inventor: Eldon L. Goates, Livonia, Mich.

[73] Assignee: Ford Motor Company, Dearborn, Mich.

[21] Appl. No.: 430,042

[22] Filed: Nov. 1, 1989

[51] Int. Cl.⁵ .......................................... B60K 20/00
[52] U.S. Cl. ................................... 74/475; 74/473 R
[58] Field of Search ...................... 74/473 R, 475, 477

[56] References Cited

U.S. PATENT DOCUMENTS

| | | | |
|---|---|---|---|
| 4,174,644 | 11/1979 | Nagy et al. | 74/475 X |
| 4,297,910 | 11/1981 | Myers | 74/473 R |
| 4,301,692 | 11/1981 | Frazee | 74/476 |
| 4,377,093 | 3/1983 | Janson | 74/477 |
| 4,608,877 | 9/1986 | Okubo et al. | 74/473 R |
| 4,799,399 | 1/1989 | Bruce | 74/477 |
| 4,807,624 | 2/1989 | Mylenek | 74/477 |

Primary Examiner—Allan D. Herrmann
Assistant Examiner—David W. Laub
Attorney, Agent, or Firm—Frank G. McKenzie; Keith L. Zerschling

[57] ABSTRACT

The reverse shift mechanism for a manual transmission includes a gear selector shaft driveably connected to a guide rail having a selector finger rotatable among several shift and axially displaceably to gear engagement positions within each shift plane. A reverse lever, pivotably supported on the transmission casing pivotally supports a camming pawl guided rotatably on a fixed post located within a slotted hole in the pawl. The lever is continually engaged with reverse idler which is moved between position of engagement and disengagement with a reverse pinion and reverse output gear the pawl defines a camming surface contacted by the selector pin and a recess for engaging the selector pin as it moves from the neutral position to the reverse drive position the selector pin disengages the recess and camming surface when it moves from the neutral position to the fifth speed position.

14 Claims, 6 Drawing Sheets

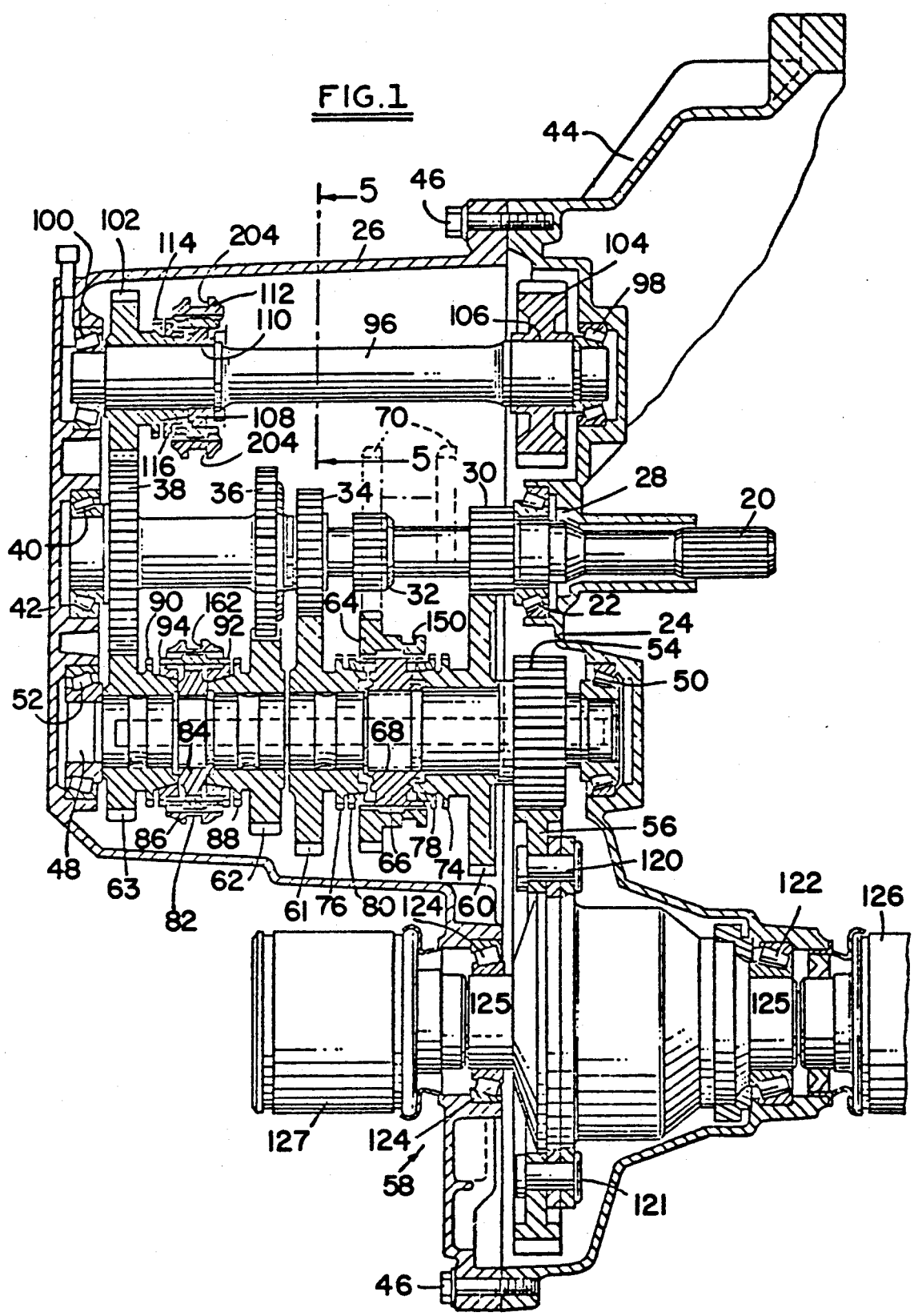

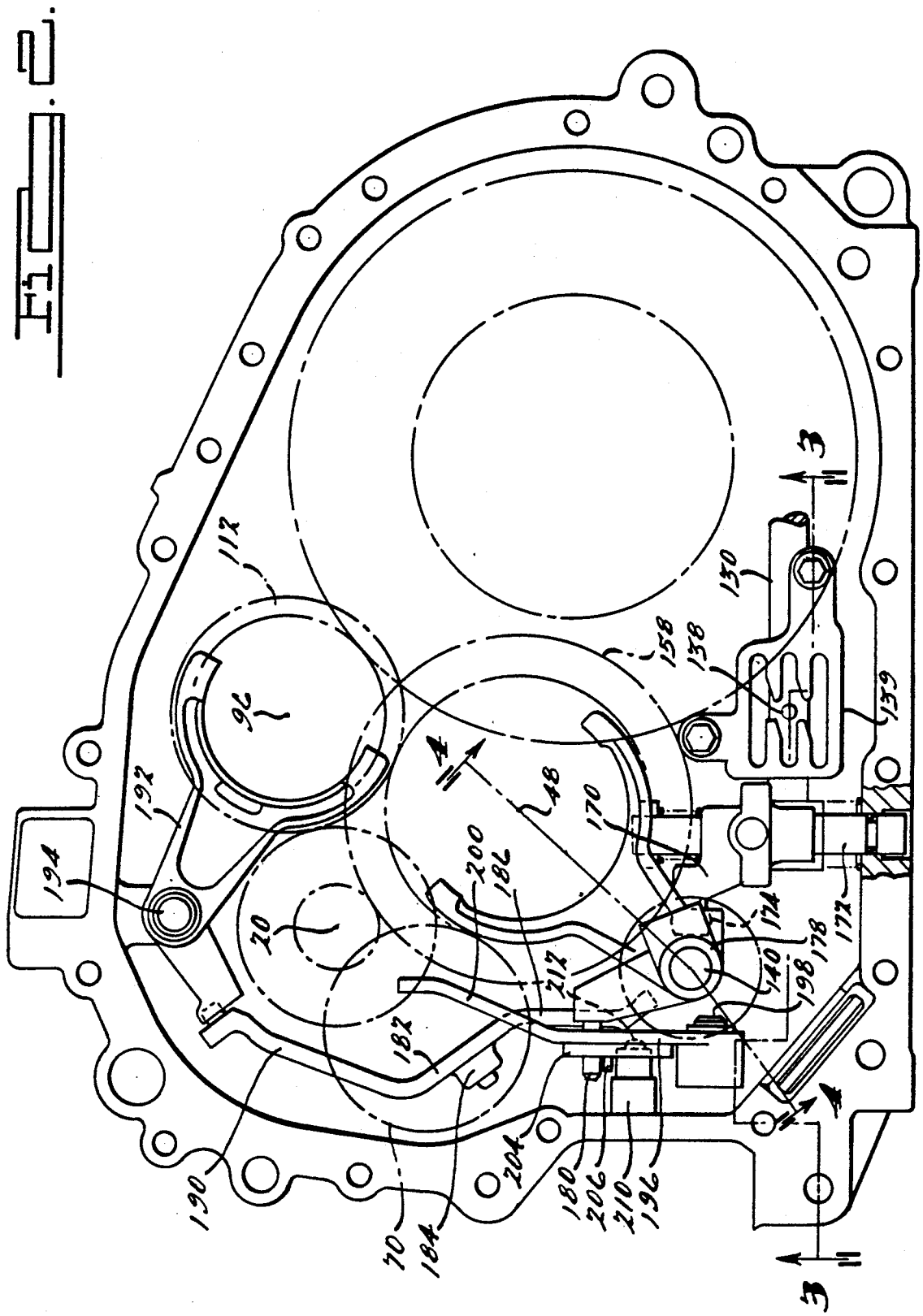

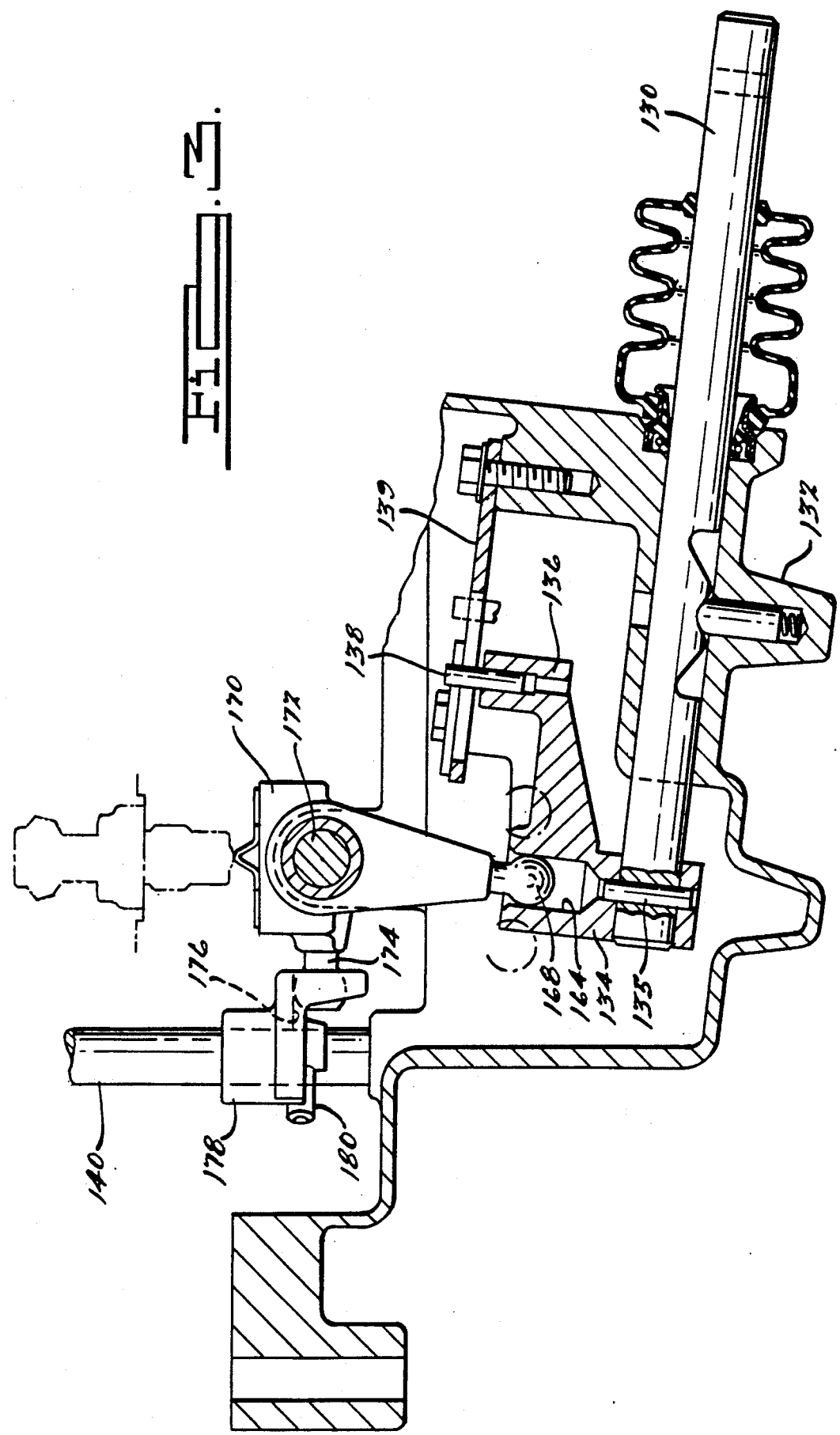

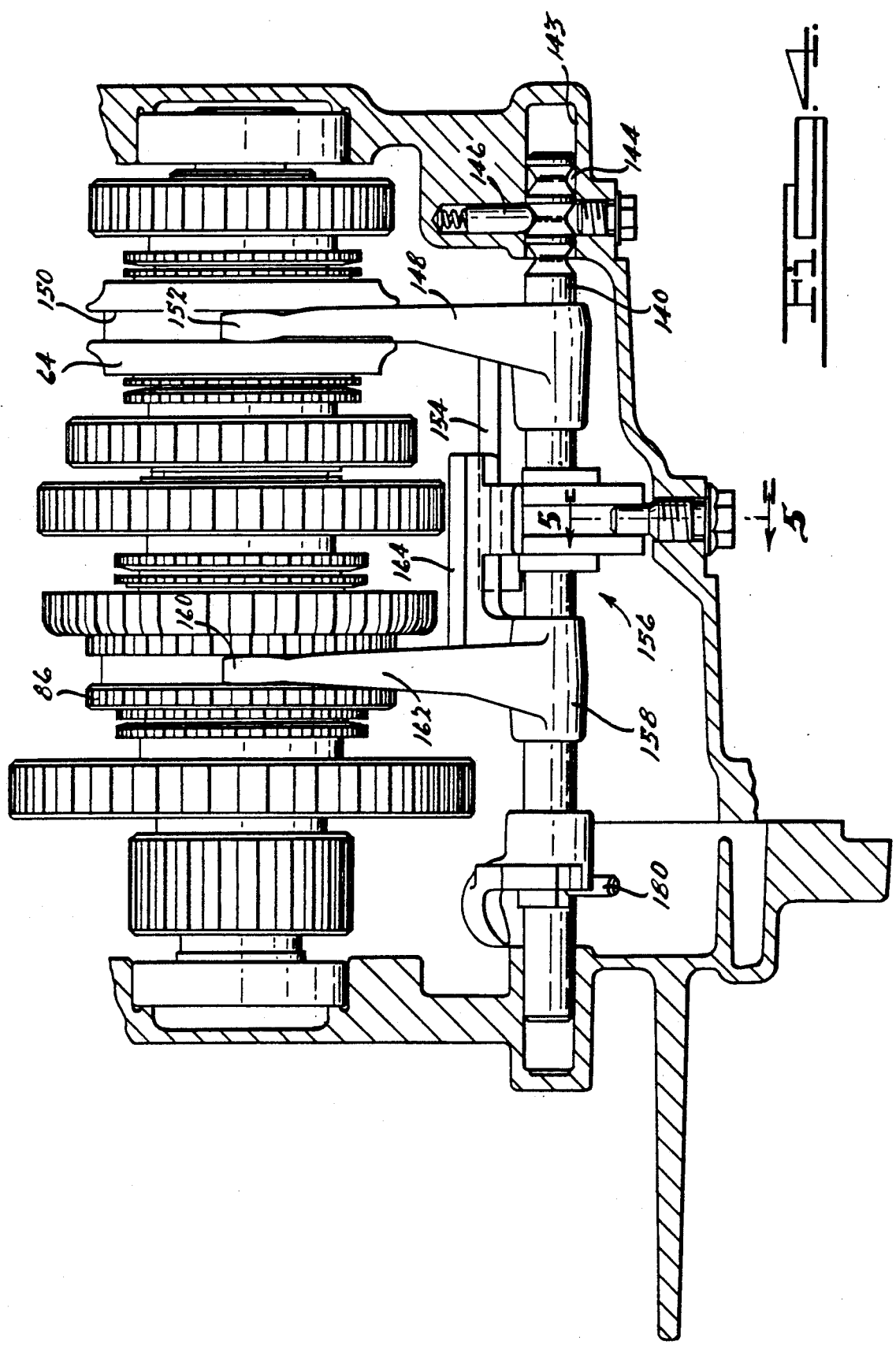

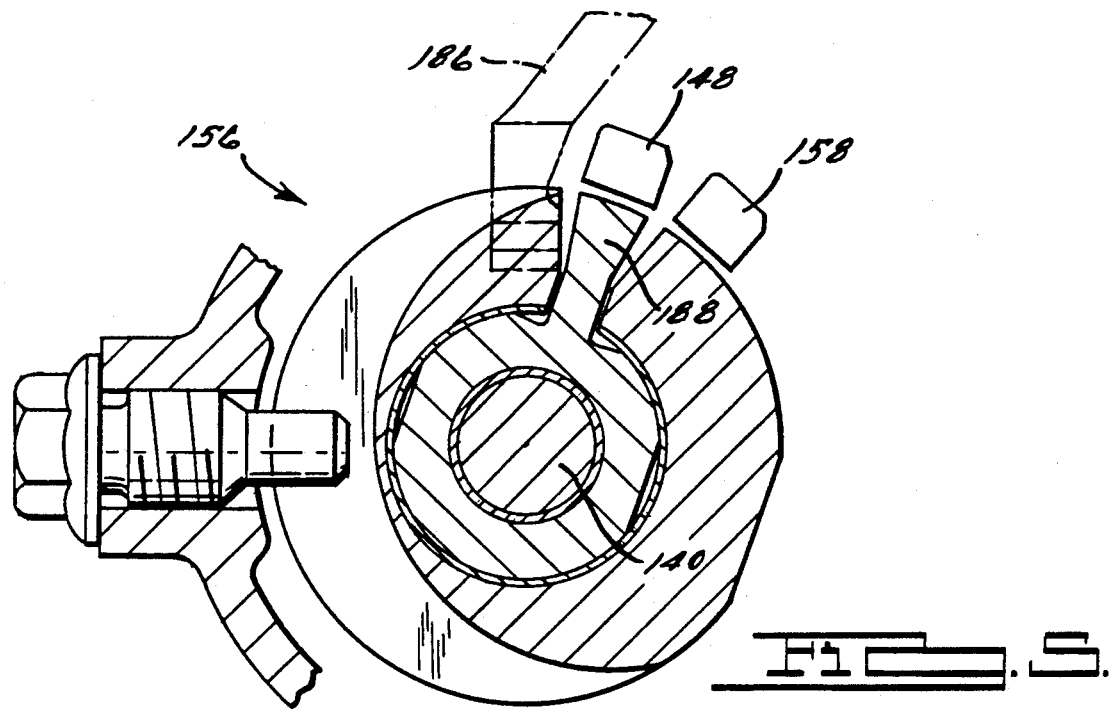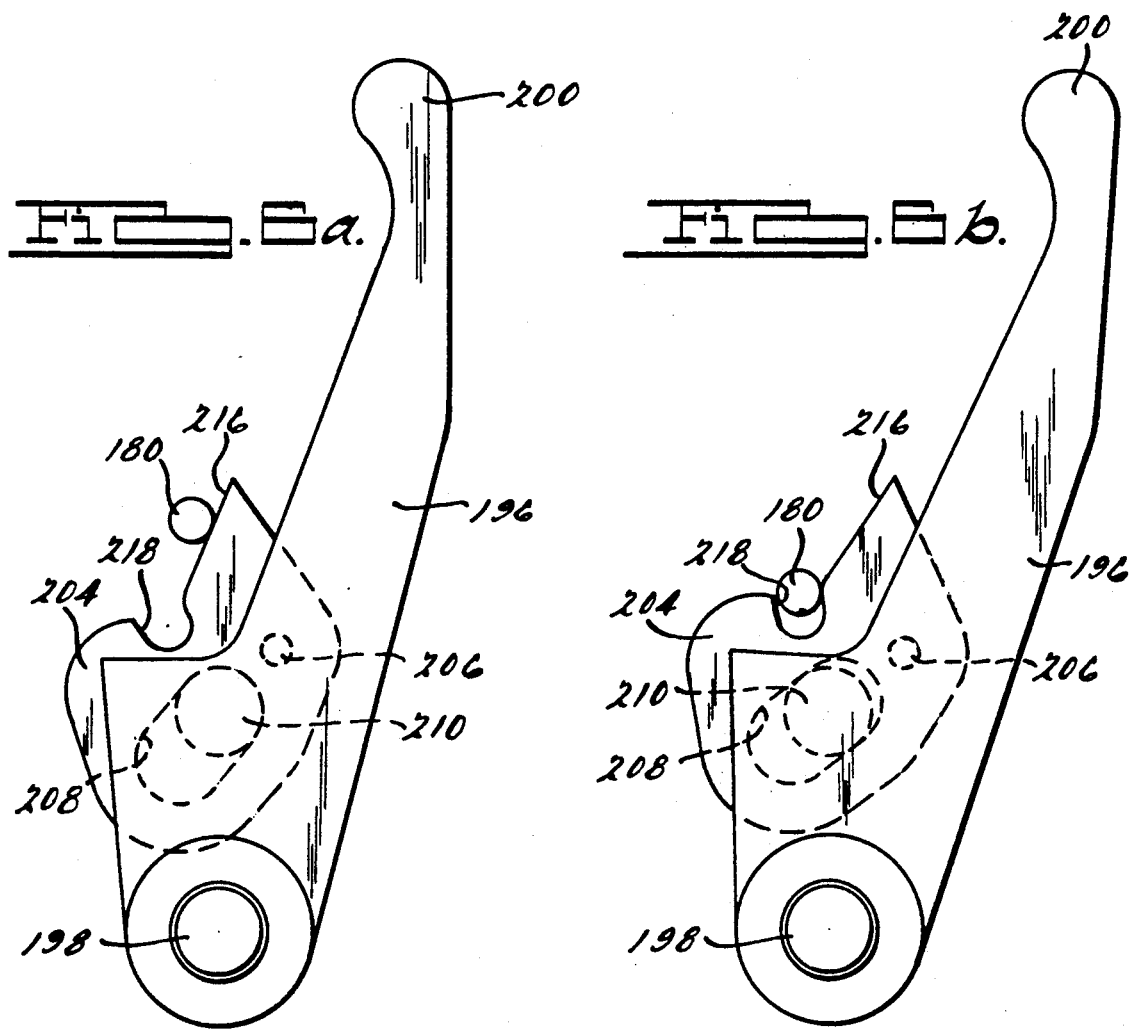

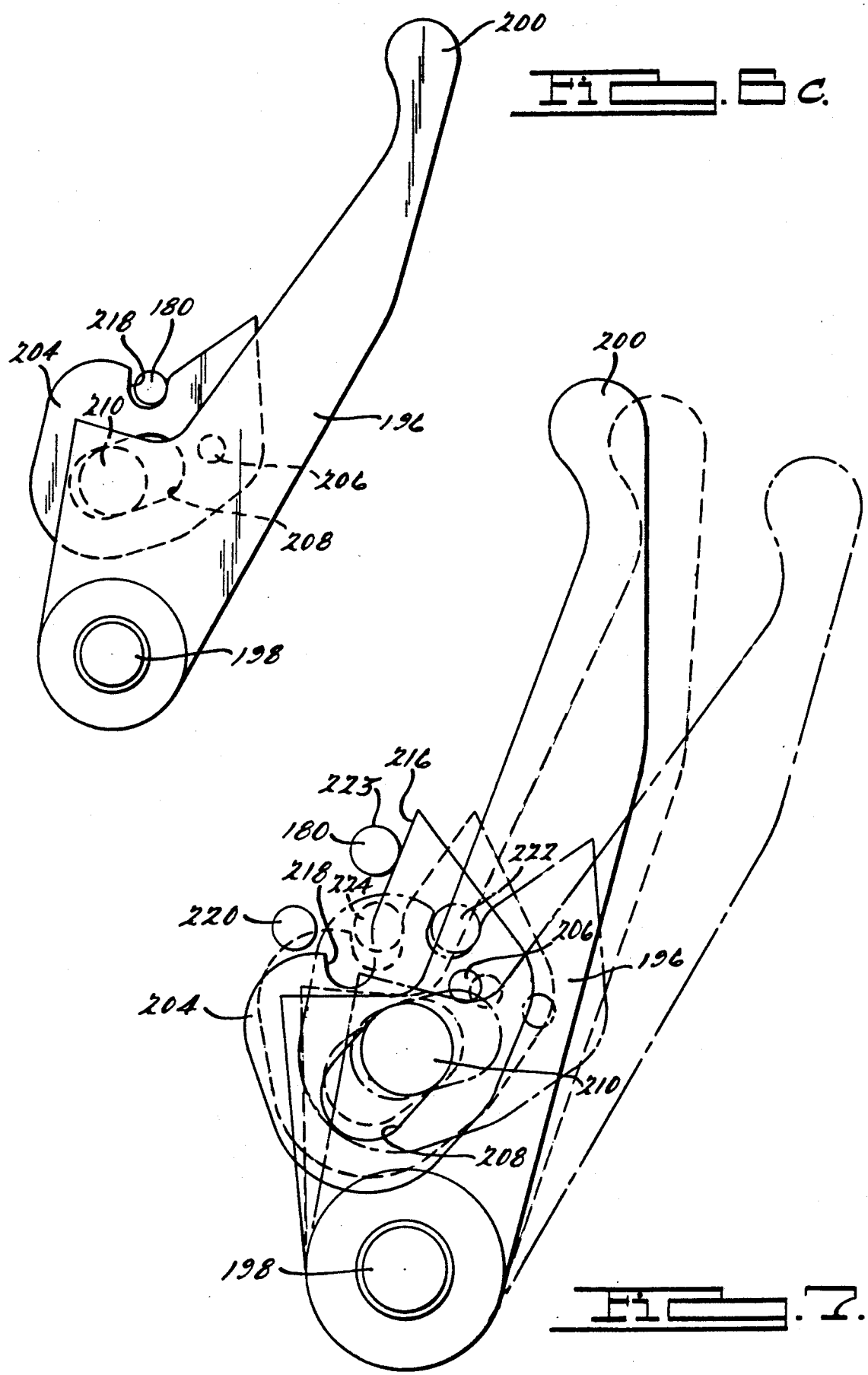

SHIFT MECHANISM FOR ENGAGING SLIDING GEAR IN MANUAL TRANSMISSION

BACKGROUND OF THE INVENTION

1. Field of the Invention

This invention relates to the field of gear shift mechanisms for automotive transmissions It more particularly pertains to a mechanism for sliding gear engagement, especiallY for reverse drive 2. Description of the Prior Art In manual transmissions that produce unsynchronized reverse drive engagement, an idler gear is moved by the shift mechanism along a support shaft into engagement with a pinion and gear to produce reverse drive. U.S. Pat. No. 4,307,624 describes a shift mechanism that produces this result in a longitudinal disposed transmission, in which the input shaft and output shaft are mutually coaxial and aligned with the engine and rear drive shaft. U.S. Pat. Nos. 4,297,910 and 4,310,692 described shift mechanisms for actuating sliding gear engagement in four-speed ratio transaxle having four speed ratios. U.S. Pat. Nos. 4,377,093 and 4,799,399 describe shift mechanisms for actuating reverse gear engagement in a five-speed transaxle.

In each of these transmissions, the shift mechanism operates under the control of the vehicle operator to pivot a bellcrank having one arm continually engaging a reverse idler and adapted to slide the idler on its support shaft when the bellcrank pivots. As the operator moves the gear selector shaft among several shift planes, and within each shift plane between gear engagement positions, a selector pin rotates and translates, its movement corresponding to that of the gear selector shaft. When the gear selector is moved to the reverse shift plane, the selector pin rotates into engagement with the reverse bellcrank. As the operator moves the gear selector to the reverse drive position, the selector pin moves axially, thereby causing the bellcrank to pivot and slide the reverse idler into engagement with a reverse pinion and reverse gear. This action completes the reverse drive torque delivery path between the engine crank shaft and transmission output shaft.

In each of these shift mechanisms the bellcrank pivots from its neutral position after the shift lever moves entirely into the reverse shift plane, and following movement from the neutral position to the reverse drive position. This requires that the shift selector be moved entirely to the reverse drive position within the reverse shift plane before the reverse idler becomes fully engaged with the reverse pinion and output gear.

SUMMARY OF THE INVENTION

Conventional shift mechanisms include many components for transmitting rotation and displacement of the shift lever to synchronizers and a sliding gear, whereby various selected gear engagements are produced. Connections between these components require conventional tolerances to accommodate manufacturing and assembly techniques, which tolerances can accumulate to produce an indefinite feel and sensitivity from the driver's standpoint. Lost motion inherent in such mechanisms causes a lack of correspondence between the movement of the synchronizer and sliding gear with that of operator control of the gear selector.

Shift mechanisms locate a forward speed ratio, usually the fifth speed ratio, in the same shift plane with the reverse drive position. This arrangement imposes a unique difficulty on the shift mechanism: the reverse idler moves in only one direction while completing the reverse drive connection, yet the selector pin that engages the reverse bellcrank must be free to move in the opposite direction independently of the reverse idler, without any mechanical connection to the idler, when the shift selector is moved between the neutral position and the fifth speed position within the 5-R shift plane.

Furthermore, it is desirable that the shift mechanism begin to move the reverse idler toward a position of engagement with the reverse pinion and gear as soon as the gear selector moves toward the 5-R shift plane. Preferably movement of the reverse idler occurs progressively, fast movement of the idler at the beginning of the shift lever stroke from the neutral position, slower movement near the end of the shift lever stroke. When these improvements are incorporated, the vehicle operator employs less effort to make the reverse drive engagement and he can more reliably distinguish a true reverse drive engagement from a block-out condition.

In realizing these advantages the shift mechanism according to the present invention includes a gear selector mounted for rotation and displacement subject to the control of the vehicle operator. A guide rail is mechanically connected to the gear selector shaft, with which it moves with corresponding motion. A selector pin carried on the guide rail extends outwardly toward a reverse pivotally supported bellcrank having an arm continually engaged with a sliding reverse idler. The idler is adapted to produce meshing engagement with the reverse pinion and the reverse gear as it slides on a support shaft subject to the action of the reverse lever.

The mechanism includes a pawl pivotally supported on the reverse bellcrank. The pawl includes a surface contacted by the selector pin as the pin moves from an adjacent shift plane into the shift plane that includes the reverse drive position. The pawl includes a recess in which the selector pin is received and retained as the pawl pivots on the lever. Its motion is guided by a slot moving against the surface of a fixed post. This guided rotation causes the recess on the pawl to rotate toward the selector pin, which concurrently moves toward the recess after the selector pin becomes seated within the recess. Further rotation of the pawl causes the recess to hold the selector pin in position for movement in both axial directions parallel to the idler gear support shaft.

Guided pivoting of the pawl causes relatively fast movement of the idler gear along its shaft as the selector pin moves toward the reverse drive plane and later, slower movement as the selector pin moves toward the reverse drive position.

To disengage reverse drive, the selector lever is moved from the reverse drive position toward the neutral position within the 5-R shift plane. This movement causes the selector pin, seated within the recess, to pivot the pawl in the opposite direction from that which produced reverse drive. This pivoting is again guided by the slotted hole of the pawl moving against the fixed post. As the pawl continues to rotate, the recess also rotates away from a position of full engagement with the selector pin yet remains connected to the selector pin when the shift mechanism reaches the neutral position within the 5-R shift plane. Thereafter, the selector pin can move to any of the forward drive positions including the fifth gear ratio position because the selector pin and pawl become mechanically disconnected except at positions of the selector pin within the 5-R shift plane located between the neutral position and the reverse drive position.

BRIEF DESCRIPTION OF THE DRAWINGS

FIG. 1 is a cross sectional view of a manual transmission gearing arrangement with which my invention can be used.

FIG. 2 is a side elevation view of a gear shift mechanism for the transmission of FIG. 1.

FIG. 3 is a cross section taken at plane 3—3 of FIG. 2.

FIG. 4 is a cross sectional view taken at plane 4—4 of FIG. 2 showing a shift rail and shift forks supported on the rail.

FIG. 5 is a cross section taken at plane 5—5 of the shift rail of FIG. 4.

FIGS. 6a-6c show a reverse lever, pawl and selector pin at progressive stages of engagement of the reverse gear.

FIG. 7 shows the reverse lever, pawl and selector pin in their respective positions when the selector pin is located at the extremities of the 5-R shift plane.

DESCRIPTION OF THE PREFERRED EMBODIMENT

REferring first to FIG. 1, input shaft 20 is journalled in a bearing 22 mounted in a support wall 24 of the clutch housing 44. A shaft seal 28, located in an annular recess formed in the support wall, seals the outer periphery of shaft 20.

Formed on, or carried by, shaft 20 are five torque input pinions identified respectively at 30, 32, 34, 36, 38. These pinions form torque delivery paths for operation in low speed ratio, reverse, second speed ratio, third speed ratio, and fourth speed ratio, respectively. Pinion 38 also operates to provide a portion of the torque delivery path for the fifth speed ratio. The left end of the input shaft is journalled by bearing 40 in a bearing opening formed in wall 42 of housing 26. The right-hand end of housing 26 is bolted to the left-hand end of clutch housing 44 by attachment bolts 46.

A counter shaft 48 is journalled at one axial in bearing 50, which is received in a recess formed in wall 24, and, at the opposite end, in bearing 52, which is received in a recess formed in wall 42. A first final pinion drive 54 is fixed to, or integrally formed with, countershaft 48 and meshes with the final drive gear 56, which drives differential gear assembly 58. Countershaft 48 supports gears 60–63, which form a part of torque delivery paths for low speed ratio, second speed ratio, third speed ratio, and forth speed ratio, respectively. The output gears 60–63 are journalled on the outer surface of countershaft 48.

Reverse gear 64, formed integrally with the 1–2 synchronizer sleeve, is carried by the synchronizer hub 66, which is splined at 68 to countershaft 48. Reverse gear 64 is splined to the outer periphery of synchronizer hub 66 and is adapted for axial sliding movement on the hub. A reverse idler pinion 70, a first gear moves within the range shown in FIG. 1 and is adapted to engage gear 64, a second gear. Reverse idler 70 moves axially on the support shaft on which it is journalled. When reverse gear 64 is in the neutral position shown in FIG. 1, and when reverse idler 70 is shifted to the left-hand position shown with dashed lines in that figure, idler 70 moves into engagement with pinion 32 and with reverse gear 64, thereby completing a reverse torque delivery path between input shaft 20 and final drive pinion 54. When the transmission operates in any ratio except reverse ratio, reverse idler 70 assumes the position at the right-hand end of its support shaft. When reverse gear 64 is shifted in the left-hand direction, the clutch teeth 76 on gear 61 engage internal clutch teeth of reverse gear 64, thereby establishing a driving connection between countershaft 48 and output gear 61. Synchronizer clutch ring 80 establishes synchronism before the clutching engagement.

The 1-2 synchronizer clutch hub 66 is splined at 68 to countershaft 48 and has internal splines on which synchronizer clutch sleave 64 is slidably mounted. Sleeve 64 has internal clutch teeth adapted to engage internal clutch teeth 74, 76, formed respectively on the hubs of the output gears 60, 61. Synchronizer clutch rings 78, 80 are located between the synchronizer clutch hub 66 and the output gears to establish rotational synchronism between countershaft 48 and either output gear 60 or 61, depending on the direction in which synchronizer sleeve 64 is moved.

A 3-4 synchronizer clutch hub 82, splined at 84 to countershaft 48, has external splines on which internally splined synchronizer clutch sleeve 86 is slidably mounted. Sleeve 86 has internal clutch teeth adapted to engage external clutch teeth 88, 90, formed respectively on the hubs of the output gear 62 and 63. In the conventional way, synchronizer clutch rings 92, 94 are positioned between the clutch hub 82 and output gears 62 and 63 to established rotational synchronism between countershaft 48 and either output gear 62 or 63, depending on the direction in which the synchronizer clutch sleeve is moved.

An auxiliary or second countershaft 96 is supported at one axial end by bearing 98, which is received in a recess formed in end wall 24, and, at the opposite axial end, by bearing 100, which is carried by a recess in end wall 42. A fifth speed ratio gear 102, journalled on the outer surface of auxiliary shaft 96, is also in meshing engagement with pinion 38, as is the fourth speed gear 63. Pinions 63 and 102 are, however, not engaged with each other. At the opposite axial end of the auxiliary countershaft, fifth speed ratio final drive pinion 104 is joined to auxiliary countershaft 96 by splines 106 and meshes with the final drive gear 56 of the differential assembly, as does pinion 54. Between the fifth speed gear 102 and fifth speed pinion 104, a third synchronizer clutch hub 108 is splined at 110 to countershaft 96. Hub 108 has external splines on which an internally splined synchronizer clutch sleeve 112 is mounted. Sleeve 112 is formed with internal clutch teeth that are adapted to engage external clutch teeth 114, formed on the hub of fifth speed input gear 102. A synchronizer clutch ring 116, positioned between external clutch teeth 114 and synchronizer clutch 108, establishes rotational synchronism between auxiliary countershaft 96 and gear 102.

The differential gear assembly 58 includes output gear 56, which is riveted to a flange formed on the differential assembly at 120, 121. The differential assembly is journalled at one end by bearing 122, which is received in annular recess formed in wall 24, and, at the opposite axial end, in bearing 124, which is received in an annular recess formed in housing 26. Double gears (not shown) mounted on drive shafts 125 transmit engine torque to each of two universal joints 126, 127, through which torque is transmitted to each of the front wheels of the vehicle.

Fifth forward speed ratio operation, which may be an overdrive condition, is produced when reverse idler pinion 70, 1-2 synchronizer sleeve 64, and 3-4 synchronizer sleeve 86 are located in their respective neutral positions. In this case, fifth speed synchronizer clutch sleeve 112 is shifted to the left into engagement with external clutch teeth 114 formed on the hub of fifth speed output gear 102 on countershaft 96. This action fixes gear 102 in driving relation on auxiliary shaft 96 by way of splines 110 formed on the inside diameter of third synchronizer clutch hub 108. The torque delivery path for fifth speed ratio operation includes input shaft 20, input pinion 38, fifth speed output gear 102, auxiliary counter shaft 96, fifth speed pinion 104 and output gear 56.

Referring now to FIGS. 2, 3, and 4, the gear shift mechanism and control includes gear selector shaft 130 mounted for rotation about its central axis and displacement along its axis, as the vehicle operator moves a shift handle connected to the selector shaft. A spring loaded detent 132 seats within recesses formed on the underside of shaft 130 to fix the axial position of the shaft at a neutral position, the position shown in FIG. 3. Within each shift plane, two gear engagement positions are located on opposite sides of the neutral position. Control block 134 has a cylindrical bore through which the selector shaft passes and upon which the control block is secured by way of roll pin 135. Block 134 includes an arm 136 that carries pin 138, movable within the slots formed in a control plate 139, mounted on the transmission casing. The slots of the control plate, illustrated in FIG. 2, define shift planes, a 1-2 plane, a 3-4 shift plane and a 5-R shift plane, each plane having the gear engagement position at the end of the corresponding slot. Rotation of selector shaft 130 causes pin 138 to move among the shift planes; axial displacement of the selector shaft causes pin 138 to move within the shift plane in which it is located.

A first shift rail 140 is supported at each axial end in cylindrical bores formed in the transmission housing. Three circumferential grooves 144, engaged selectively by a detent spring loaded to maintain engagement with the recess, correspond to the neutral position and the two gear engagement positions within each shift plane. A first shift fork 148, slidably supported on the shift rail, includes selector fingers 152, which extend radially outward from the shift rail and are received in an annular groove 150 formed in the hub of reverse gear 64. The shift fork has an axially extending arm 154 directed toward a shift interlock mechanism generally indicated by reference number 156.

A second shift fork 158 is slidably received over shift rail 140 and includes selector fingers 160 extending outward from the shift rail and received in annular groove 162, formed on the outer surface of the second synchronizer clutch sleeve 86. Fork 158 includes an axially extending arm 164 directed toward the shift interlock.

Control block 134 has a bore 164 extending radially outward from the selector shaft and engaged by an extension 168 located at the end of bellcrank 170, which is journalled for rotational on shaft 172. Bellcrank 170 pivots about the axis of shaft 172 to which it is secured, and the shaft can slide axially in bores in the transmission housing. The end of extension 168 is shaped to provide a truncated spherical radius sized to fit within bore 164. A second arm 174 of control block 170 extends radially outward from the axis of shaft 172 and similarly terminates in a truncated spherical radius sized to fit within bore 174 of a third control block 178. Bore 176 extends radially outward from the longitudinal axis of guide rail 140, to which control block 178 is fixed. The guide rail permits control block 178 to rotate about the axis of shaft 140 and to displace linearly along the axis in response to movement of a selector pin 180, secured to the control block 178 and extending radially outward from the axis of guide rail 140.

A reverse shift bellcrank 182, mounted pivotably on the reverse idler support shaft at 184, includes an arm 186 located adjacent to the shift interlock 156 for engagement by finger 188 as it rotates into the 5-R shift plane. Bellcrank 182 has a second arm 190, mechanically connected to the fifth speed shift fork 192, which is slidably mounted on a second shift rail 194 and fitted within a recess 204 on the fifth speed synchronizer sleeve 112. As shift rail 140 rotates to the 5-R shift plane, finger 188 becomes located in the end of bellcrank arm 186. Thereafter, movement of the gear selector lever to the fifth gear position causes shift rail 140 to move axially, thereby pivoting bellcrank 182, axially displacing fork 192 on its shift rail 194, and moving synchronizer sleeve 112 into engagement with the dog teeth and clutch teeth 114, 116. This action driveably connects the fifth speed output gear to auxiliary countershaft 96, which is driveably connected through output pinion 104 and output gear 56 to the differential mechanism 58. When the gear selector is moved from the fifth speed ratio position within the 5-R shift plane, finger 190 pivots the fifth speed bellcrank 182 in the opposite direction, thereby disconnecting synchronizer sleeve 112 from the clutch teeth and dog teeth 114, 116 because shift fork 192 is displaced on shift rail 194 away from the engagement position as the bellcrank rotates.

Located on shift rail 140 and displaced axially from interlock mechanism 156, the shift rail carries a selector finger 180 fixed to the shift rail for axial displacement and rotation in accordance with the position of the selector mechanism. Reverse drive lever 196 is pivotably mounted on the transmission casing at 198 and has an arm 200 extending away from the pivot and continually engaging reverse idler 70, which is journalled on the idler support shaft 202 for rotation about the axis of the shaft and axial displacement along the axis. As lever 196 pivots, idler 70 moves into and out of engagement with reverse pinion and output gear 32, 64. Reverse lever 196 carries a pawl 204, which is rotatable about a riveted connection 206. The pawl has a slotted hole 208 directed away from rivet 206, in which hole a post 210 is located. The post is fixed to the transmission casing and includes a spring-loaded detent button 212 engaging corresponding recesses formed in the adjacent face of the reverse lever 196. The detent recesses correspond to the neutral position and to the reverse drive position. The pawl also includes cam surface 216 and a recess 218, sized to receive selector finger 180 and adapted to retain the selector finger therein.

Operation of the reverse drive mechanism is described next with reference to FIGS. 6a-6c and 7. As selector finger 180 moves from the neutral position in the 3-4 shift plane to the neutral position within the 5-R shift plane, it contacts surface 216 of the camming pawl. Continued movement of finger 180 toward the 5-R plane rotates the pawl about the axis of the pivoted connection 206, subject to the guided restraint afforded by post 210 and slotted hole 208. FIG. 6a shows the components of the reverse mechanism approximately at the location of the first contact between finger 180 and surface 216. FIG. 6b shows the selector finger located at the neutral position within the 5-R shift plane. While moving from the position of FIG. 6a to that of FIG. 6b, the camming pawl rotates clockwise causing recess 218 to move toward, and to engage, the selector finger. Then, the selector finger slides along the axis of guide rail 140 to the reverse drive position, where it is located in FIG. 6c. Movement of the selector finger from the position of FIG. 6b to that of FIG. 6c forces the selector finger against the recess of the camming pawl, causing further clockwise rotation of the camming pawl, which more fully seats the selector finger within recess 218.

When the selector finger moves from the neutral position in the 3-4 plane to the neutral position in the 5-R plane, the finger contacts surface 216 and causes reverse lever 196 to rotate clockwise even before the selector finger 180 reaches the reverse drive position within the 5-R shift plane. Rotation of the lever can be seen by comparing its position in FIGS. 6a and 6b. Clockwise rotation of the lever continues to a position of full engagement with the reverse pinion and gear as the selector finger moves along the axis of shift rail 140 from the position of FIG. 6b to that of FIG. 6c. Therefore, engagement of the reverse idler with the reverse pinion and gear occurs before the selector finger reaches the reverse drive position, the fully engaged position of FIG. 6c.

When the selector finger moves from the fully engaged position of FIG. 6c to the neutral position within the 5-R shift plane, selector finger 180 is forced against the sides of recess 218, causing the pawl and lever 196 to rotate counterclockwise. When the selector finger reaches a position between the neutral position in the 5-R shift plane and the reverse drive position shown in FIG. 6b, the selector finger begins to disengage from recess 180.

When shift rail 140 moves from the neutral position to the fifth speed position within the 5-R shift plane, selector finger 180 moves out of contact with surface 216. Thereafter, the reverse engagement mechanism is unaffected by movement of the selector finger from the neutral position to the fifth speed position. Within this latter range of motion, to produce fifth gear drive, the second selector finger 188 on shift rail 140 moves into engagement with the end of arm 186 on the reverse bellcrank 182.

Operation of the reverse drive mechanism in the 5-R plane is shown in FIG. 7 with the selector finger 180 in the fifth speed position at 220, the reverse drive position at 222, and the neutral position at 224. Within the 5-R shift plane, reverse lever 196 and pawl 204 are shown in positions corresponding to the various positions of the selector finger Operation of the entire shift mechanism in the 5-R shift plane begins with movement of the shift lever to the neutral position midway between the fifth and reverse gear positions. To do this, shaft 130 rotates as the selector lever is moved laterally, bellcrank 170 moves along shaft 172, shift rail 140 and control block 178 rotate as a unit, and selector finger 180 rotates from the neutral position 223 in the 3-4 shift plane to the neutral position 224 in the 5-R shift plane. Concurrently, selector finger 288 rotates with the shift rail into alignment with the end of reverse bellcrank arm 186 at the shift interlock 156, as FIG. 5 shows.

Fifth gear can then be produced by moving the shift lever forward, thereby sliding selector shaft 130 along its axis rightward (when reviewed as in FIGS. 2 and 3), engaging detent 132 in the corresponding recess, rotating bellcrank 170 counterclockwise and displacing control block 178 downward along shaft rail 140. This action moves selector finger 180 from contact with pawl 204 at position 224 in FIG. 7 to position 220, where finger 180 is spaced from the pawl. Concurrently, selector finger 188 moves axially downward on rail 140, thereby pivoting bellcrank 182 about shaft 184, sliding fork 192 into engagement with fifth speed pinion 102, connecting pinion 102 to shaft 96 and to output gear 104.

Reverse gear can be produced after the selector lever is moved to the neutral position 224 in the 5-R shift plane, thereby placing the components of the shift mechanism in position described above. Then, rearward movement of the shift lever moves selector shaft forward, rotates bellcrank 170 clockwise and displaces control block 178 downward along shift rail 140. This action moves selector finger 180 from position 224 (in FIG. 7) to position 220, rotates the reverse lever clockwise and slides the reverse idler leftward (when viewed as in FIG. 1) into engagement with reverse pinion 32 and reverse gear 64.

Having described the preferred embodiment of my invention, what I claim and desire to secure by U.S. Letters Patent is:

1. A mechanism for controlling gear shifts in a manual transmission comprising:

a gear selector mounted for rotation and axial displacement in response to control of the vehicle operator, defining shift planes containing gear engagement positions, each gear engagement position corresponding to a gear selected for operation;

a guide rail driveably connected to the gear selector shaft for movement therewith among shift planes and gear engagement positions corresponding to those of the gear selector, carrying a selector pin extending outward therefrom;

a first gear and second gear, the first gear slidably mounted for movement into and out of engagement with the second gear;

a lever having an arm extending outward from a pivotable support, engaging the first gear and causing the first gear to slide on the support shaft as the lever arm pivots; and means for releaseably connecting the selector pin and lever and for pivoting the lever arm as the selector pin moves toward the first shift plane.

2. The mechanism of claim 1 wherein the connecting means comprises:

a pawl pivotably supported on the lever, having a surface located for contact with the selector pin as said selector pin moves into the first shift plane, said pawl defining a recess for receiving and retaining the selector pin therein; and means for guiding the selector pin to a seated position in the recess as the pawl rotates on its pivotable support.

3. The mechanism of claim 2 wherein the pawl further includes a slotted hole extending through the pawl substantially parallel to the pivotable support at which the pawl is supported on the lever, and wherein the guide means includes a post fixed in position and extending into the slotted hole.

4. A mechanism for controlling gear shifts in a manual transmission comprising:

a guide rail mounted for rotation and axial displacement in response to control of the vehicle operator, defining shift planes containing gear engagement positions, each gear engagement position corresponding to a gear selected for operation, carrying a selector pin extending outward therefrom;

a first gear and second gear, the first gear slidably mounted for movement into and out of engagement with the second gear;

a lever having an arm extending outward from a pivotable support, engaging the first gear and causing the first gear to slide on the support shaft as the lever arm pivots; and means for releaseably connecting the selector pin and lever and for pivoting the lever arm as the selector pin moves toward the first shift plane.

5. The mechanism of claim 4 wherein the connecting means comprises:

a pawl pivotably supported on the lever, having a surface located for contact with the selector pin as said selector pin moves into the first shift plane, said pawl defining a recess for receiving and retaining the selector pin therein; and means for guiding the selector pin to a seated position in the recess as the pawl rotates on its pivotable support.

6. The mechanism of claim 5 wherein the pawl further includes a slotted hole extending through the pawl substantially parallel to the pivotable support at which the pawl is supported on the lever, and wherein the guide means includes a post fixed in position and extending into the slotted hole.

7. A mechanism for controlling gear shifts in a manual transmission comprising:

a gear selector shaft mounted for rotation between first and second shift planes and axial movement within each shift plane;

a first control block fixed to the selector shaft;

a guide rail mounted for rotation about, and axial displacement along, an axis that extends transversely with respect to the selector shaft;

a second control block fixed to the guide rail having a selector pin extending outward therefrom;

a first bellcrank mounted for rotation about and axial displacement along an axis that extends transversely with respect to the selector shaft, having one arm engaged in the first control block and a second arm engaged in the second control block, whereby axial displacement and rotation of the selector shaft produce axial displacement and rotation, respectively, of the guide rail;

a first gear supported for sliding movement;

a lever supported for pivotal movement, having a first arm engageable by the selector pin upon rotation of the guide rail into the first shift plane and a second arm engaging the first gear and causing the first gear to slide as the lever pivots; and means for releaseably connecting the selector pin and lever.

8. The mechanism of claim 7 further comprising means for pivoting the lever arm as the selector pin moves toward the first shift plane 9. The mechanism of claim 7 wherein the connecting means comprises:

a pawl pivotably supported on the lever, defining a recess for receiving and retaining the selector pin therein; and means for guiding the selector pin to a seated position in the recess as the pawl rotates on its pivotable support.

10. The mechanism of claim 8 wherein the pivoting means comprises a pawl having a surface located for contact with the selector pin as said selector pin moves into the first shift plane.

11. The mechanism of claim 9 wherein the pawl further includes a slotted hole extending through the pawl substantially parallel to the pivotable support at which the pawl is supported on the lever, and wherein the guide means includes a post fixed in position and extending into the slotted hole.

12. A mechanism for controlling gear shifts in a manual transmission comprising:

means for moving between first and second shift planes and for moving within a shift plane;

a first gear and second gear, the first gear slidably mounted on a support shaft for movement into and out of engagement with the second gear;

means for sliding the first gear on the support; and means for releaseably connecting the moving means and sliding means and for actuating the sliding means as the selector pin moves from the second shift plane to the first shift plane.

13. The mechanism of claim 12 wherein the connecting means comprises:

a pawl pivotably supported on the lever, having a surface located for contact with the moving means as it moves to the first shift plane from the second shift plane, said pawl defining a recess for receiving and retaining the moving means therein; and means for guiding the moving means to a seated position in the recess as the pawl rotates on its pivotable support.

14. The mechanism of claim 13 wherein the pawl further includes a slotted hole extending through the pawl substantially parallel to the pivotable support at which the pawl is supported on the lever, and wherein the guide means includes a post fixed in position and extending into the slotted hole.

* * * * *